United States Patent [19]
Cheslock

[11] Patent Number: 5,344,339
[45] Date of Patent: Sep. 6, 1994

[54] MULTI-PURPOSE RECEPTACLE

[75] Inventor: Edward P. Cheslock, Lincoln University, Pa.

[73] Assignee: Lasko Holdings, Inc., West Chester, Pa.

[21] Appl. No.: 118,307

[22] Filed: Sep. 9, 1993

[51] Int. Cl.⁵ .......................................... H01R 13/73
[52] U.S. Cl. ................... 439/501; 439/577; 206/372; 206/373
[58] Field of Search ............... 439/501, 577; 206/372, 206/373; 220/735

[56] References Cited
U.S. PATENT DOCUMENTS

| | | | |
|---|---|---|---|
| D. 269,116 | 5/1983 | Armbruster | D23/140 |
| D. 275,698 | 9/1984 | Armbruster | D23/140 |
| 1,635,183 | 7/1927 | Jeannotte | 182/33 |
| 2,819,938 | 1/1958 | Zerver | 206/373 |
| 3,099,398 | 7/1963 | Croteau | 439/577 |
| 3,751,845 | 8/1973 | Van Leeuwen | 43/56 |
| 4,101,089 | 7/1978 | Culbertson et al. | 242/85.1 |
| 4,353,613 | 10/1982 | Carlow | 439/501 |
| 4,366,998 | 1/1983 | Kaiser | 312/235 R |
| 4,424,006 | 1/1984 | Armbruster | 417/234 |
| 4,483,664 | 11/1984 | Armbruster | 417/234 |
| 4,875,878 | 10/1989 | Meyer | 439/577 |
| 5,076,405 | 12/1991 | Modica | 190/1 |
| 5,083,241 | 1/1992 | Foster | 362/33 |

Primary Examiner—Gary Paumen
Attorney, Agent, or Firm—Z. T. Wobensmith, III

[57] ABSTRACT

A multi-purpose receptacle that functions as a portable caddy, a storage container, a support platform, a step stool and which has electrical and light outlets. The receptacle is formed of molded plastic with an internal storage capacity, and with external tool carrying pockets, a work platform, stud braces, a source of electrical power, and a detachable electric light.

10 Claims, 5 Drawing Sheets

MULTI-PURPOSE RECEPTACLE

BACKGROUND OF THE INVENTION

1. Field of the Invention

This invention relates to a multi-purpose portable receptacle of the type that is useful for support and to transport and store tools and other items.

2. Description of the Prior Art

There has been an ever increasing trend among home owners and others towards doing their own major and minor repairs, modifications and improvements to properties.

Various apparatus have been proposed to assist the handyman such as shown in the U.S. Pat. Nos. to Armbruster No. Des. 269,116; Armbruster No. Des. 275,698; Jeannotte No. 1,635,183; Croteau No. 3,099,398; Van Leewen No. 3,751,845; Culbertson No. 4,101,089; Carlow No. 4,353,613; Kaiser No. 4,366,998; Armbruster No. 4,424,006; Armbruster No. 4,483,664; Meyer No. 4,875,878; Modica No. 5,076,405; and Foster No. 5,083,241.

One of the problems encountered in undertaking such projects which the prior art does not solve is the easy storage and transport of the multiplicity of tools required to perform the tasks. Tool boxes have long been available to carry individual tools such as power drills, sanders, hammers, screwdrivers and other tools but most of them are single purpose, and not suitable for carrying a variety of tools. In addition, electricity to operate power tools and illumination of the job site is often not readily available on or close to the job site, necessitating separate extension cords and portable lights. Support for the person doing the work often necessary whether it be a convenient seat or a step stool to permit reaching the ceiling or top of a doorway. If lumber such as studs or molding are to be cut, saw horses or other support for the material is required. The present invention fulfills the demand by providing a portable, multipurpose receptacle that also serves as a tool caddy, work platform, step stool, source of illumination and electric power.

SUMMARY OF THE INVENTION

This invention relates to a multipurpose receptacle which is useful as a portable tool caddy, work platform, step stool and source of electricity and light.

The principal object of the invention is to provide a portable multipurpose receptacle.

A further object of the invention is to provide a receptacle for the character aforesaid which provides a source of illumination and a source of electric power.

A further object of the invention is to provide a receptacle of the character aforesaid which has both internal and external provisions for carrying tools and other objects.

A further object of the invention is to provide a receptacle of the character aforesaid which provides a step stool and a work platform.

A further object of the invention is to provide a receptacle of the character aforesaid which is simple and inexpensive to construct but sturdy and reliable in use.

A further object of the invention is to provide a receptacle of the character aforesaid which is preferably formed of a lightweight molded plastic.

Other object and advantageous features of the invention will be apparent from the description and claims.

DESCRIPTION OF THE DRAWINGS

The nature and characteristic features of the invention will be more readily understood from the following description taken in connection with the accompanying drawings forming part hereof, in which.

Figure 1:
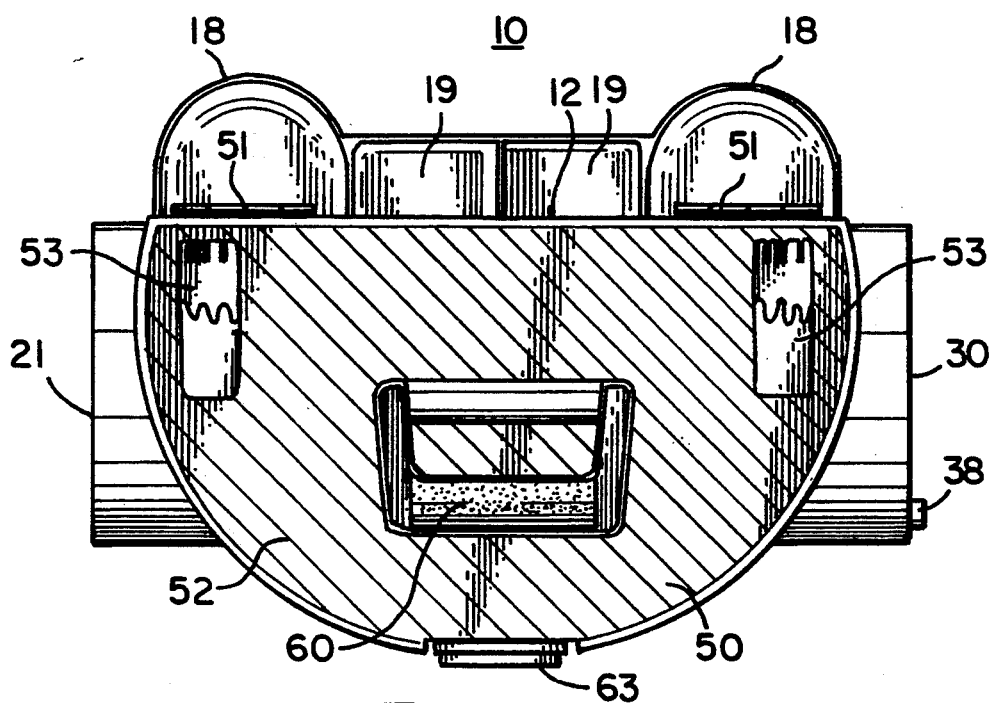
FIG. 1 is a top plan view of the receptacle of the invention.

It should of course be understood that the description and drawings herein are merely illustrative and that various modifications and changes can be made in the structure disclosed without departing from the spirit of the invention.

Like numerals refer to like parts throughout the several views.

DESCRIPTION OF THE PREFERRED EMBODIMENT

Referring now more particularly to the drawings and FIGS. 1 to 7 thereof the multi-purpose receptacle 10 is therein illustrated. The receptacle 10 has a housing 13 open at the top with a curved semi-circular front wall 11 which extends around to and meets a flat rear wall 12. The front wall 11 is provided with cutouts 14 between which its bottom rim 15 rests on the floor or other surface (not shown) for support.

The rear wall 12 is also provided with cutouts 16 between which the bottom rim 17 of the wall 12 rests on the floor or other surface (not shown) for support.

The rear wall 12 is provided with a pair of tool holsters 18 which are integral with the wall, extend outwardly of semi-circular shape, and can accommodate a variety of power tools (not shown) such as a drill, screwgun, or other tool that fits into the holster. The rear wall 12 between and spanning the holsters 18 is provided with a pair of pockets 19 which can accommodate the cords from power tools (not shown) carried in the holsters 18.

Figure 2:
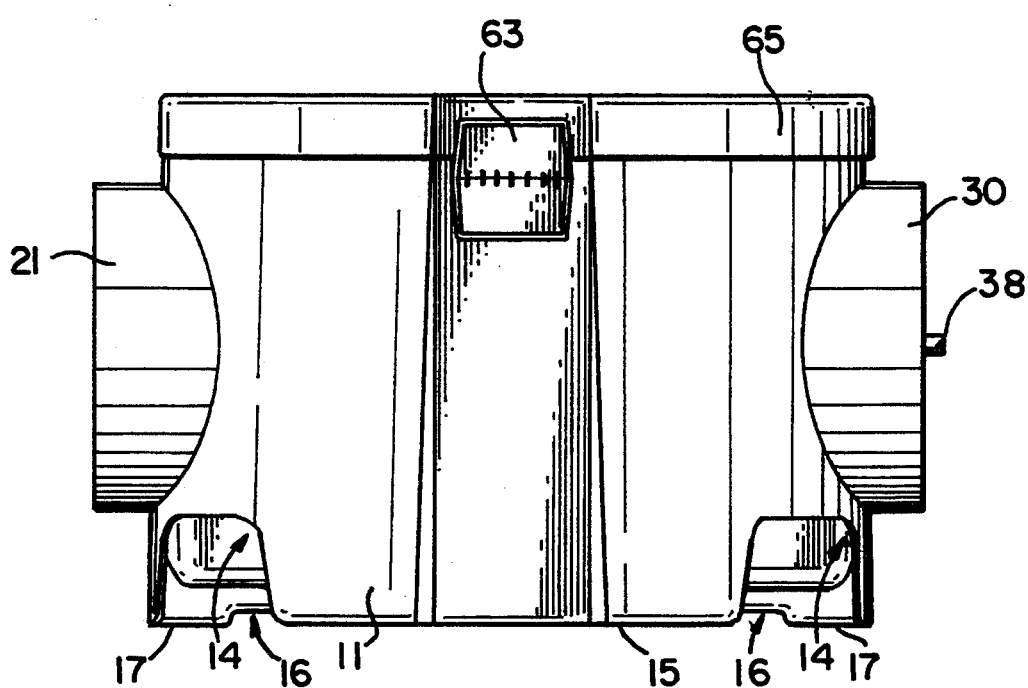
FIG. 2 is a front view of the receptacle of FIG. 1.
Figure 3:
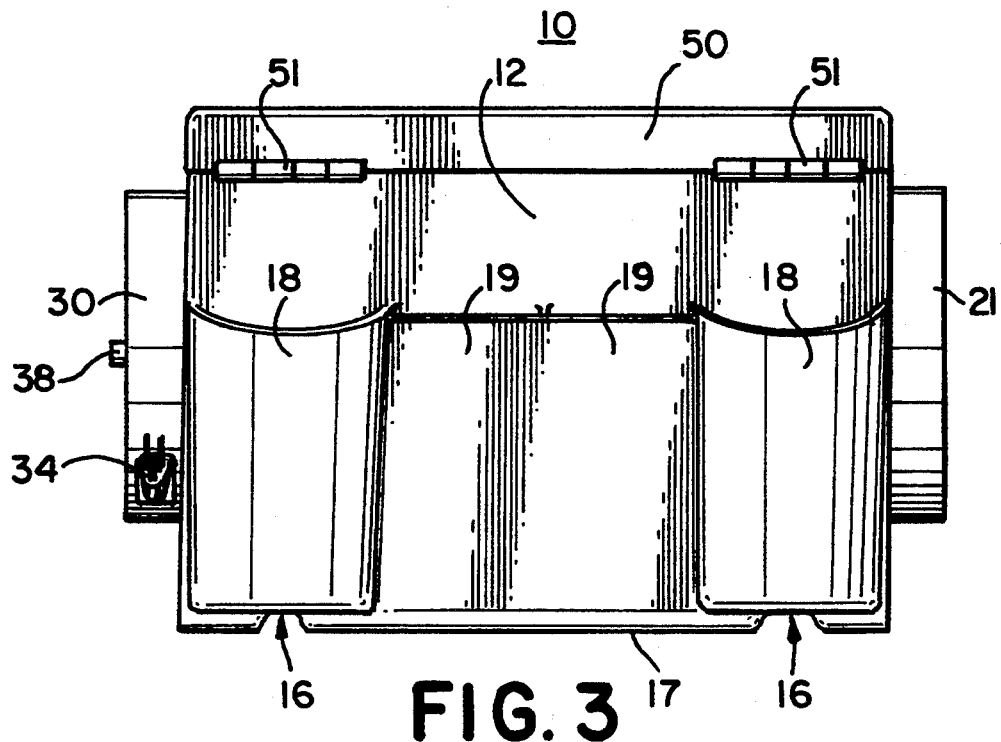
FIG. 3 is a rear view of the receptacle of FIG. 1; .
Figure 4:
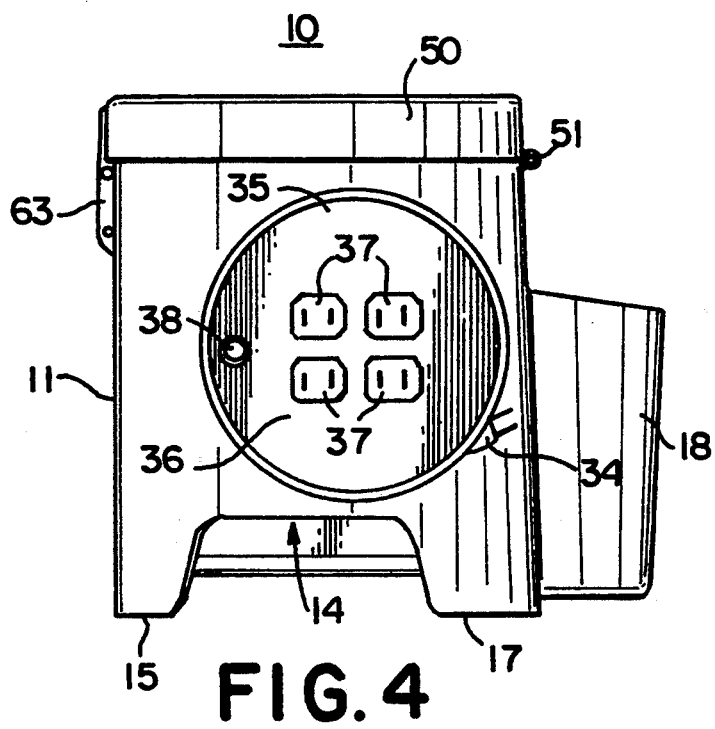
FIG. 4 is a right side view of the receptacle of FIG. 1.
Figure 5:
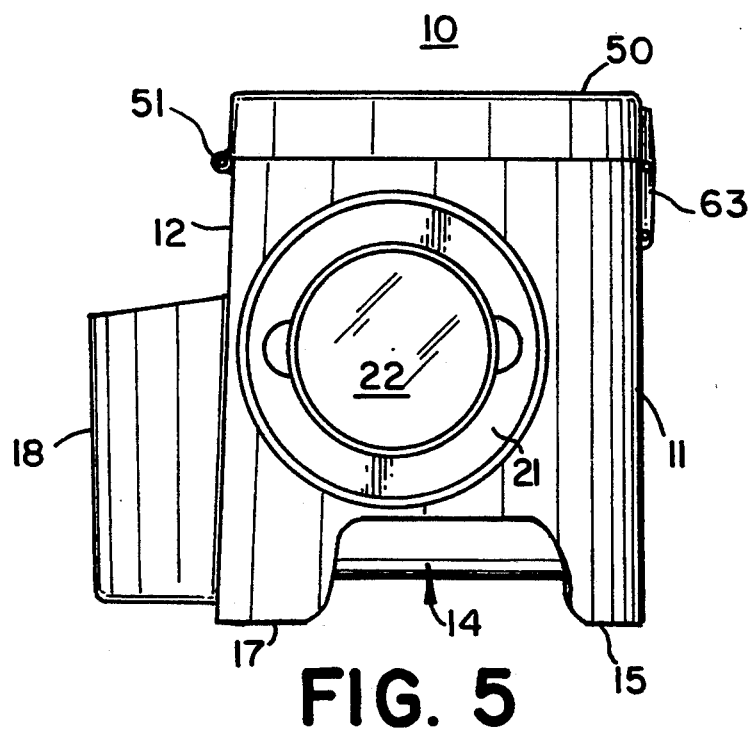
FIG. 5 is a left side view of the receptacle of FIG. 1.
Figure 6:
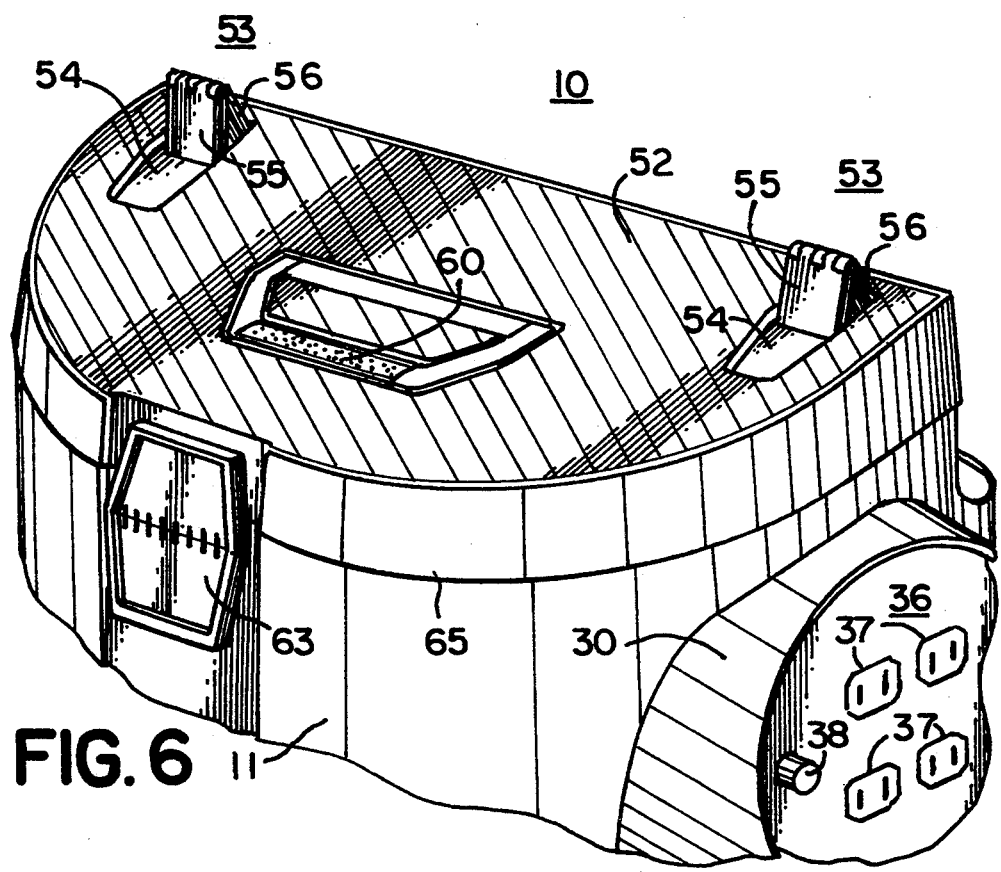
FIG. 6 is a front, fragmentary, enlarged view in perspective of the receptacle of FIG. 1 with stud braces or holders in the up position, and a carrying handle in storage position.
Figure 7:
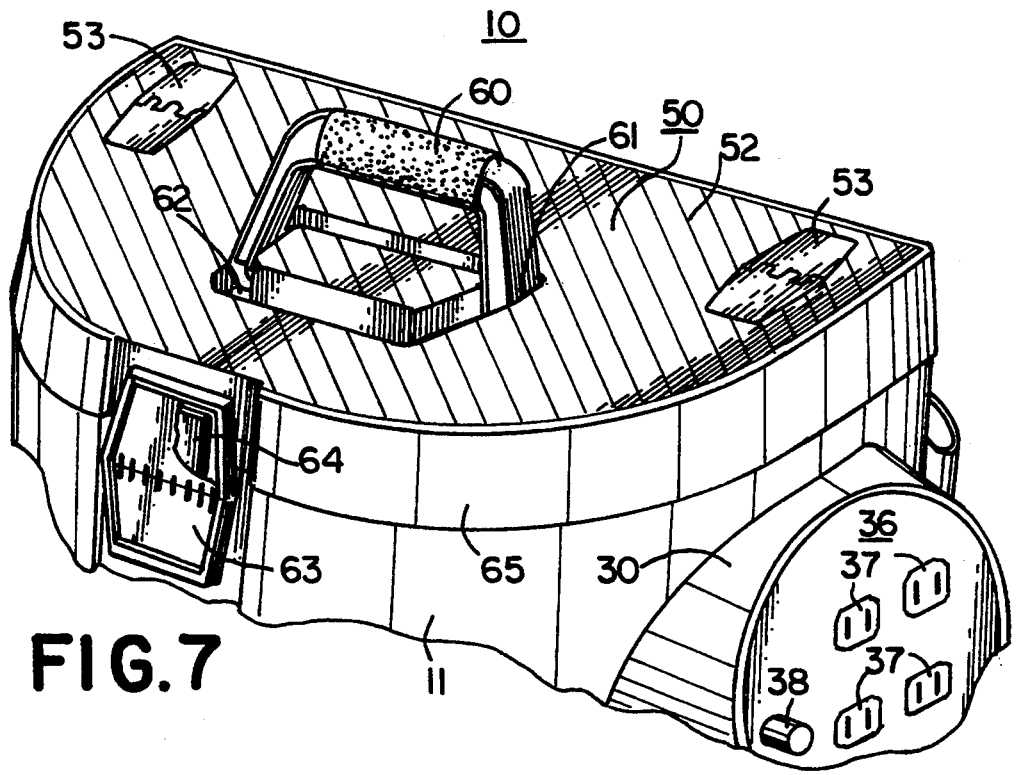
FIG. 7 is a view similar to FIG. 6 with the stud braces in storage position and the handle in carry position.
Figure 9:
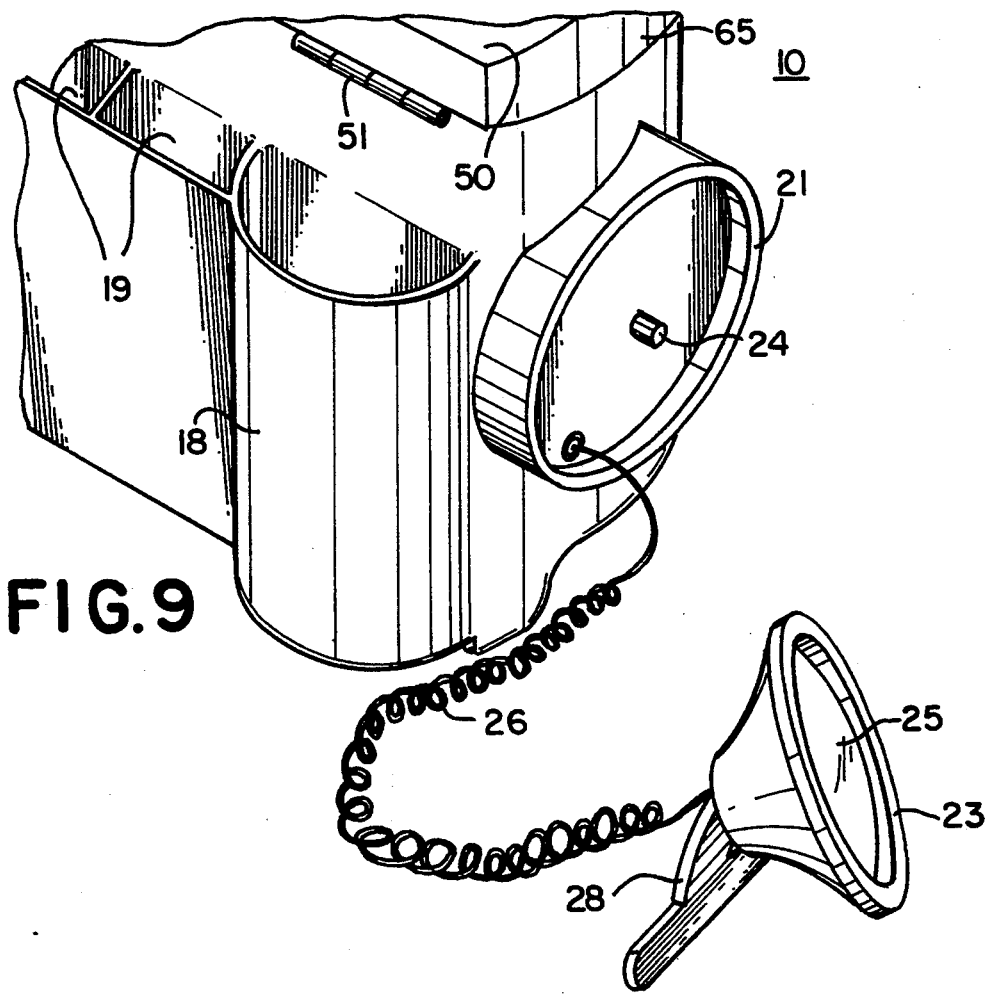
FIG. 9 is a fragmentary, rear perspective view, enlarged from the left side illustrating the removable light.

The front wall 12 at the left as seen in FIGS. 2, 5, and 9 has a cylindrical light holder 21 extending therefrom, which can accommodate a light assembly 22 which includes a socket 23. An opening (not shown) is provided in socket 23 which fits over a stud 24 that extends from the wall 12 to detachably retain the light assembly 22 thereon. The socket 23 has a light bulb 25 therein of conventional type and a cord 26 connected thereto and to internal electrical circuitry (not shown) of receptacle 10. The cord 26 is of conventional type which can be plugged into the receptacle circuitry or disconnected and plugged into a conventional wall socket (not shown). The socket 23 can also be engaged by a detachable T-shaped stand 28 for support of the light assembly 22 and which can rest on the floor or other surface (not shown) or can be engaged with portions of the receptacle 10 such as the holsters 18.

Figure 10:
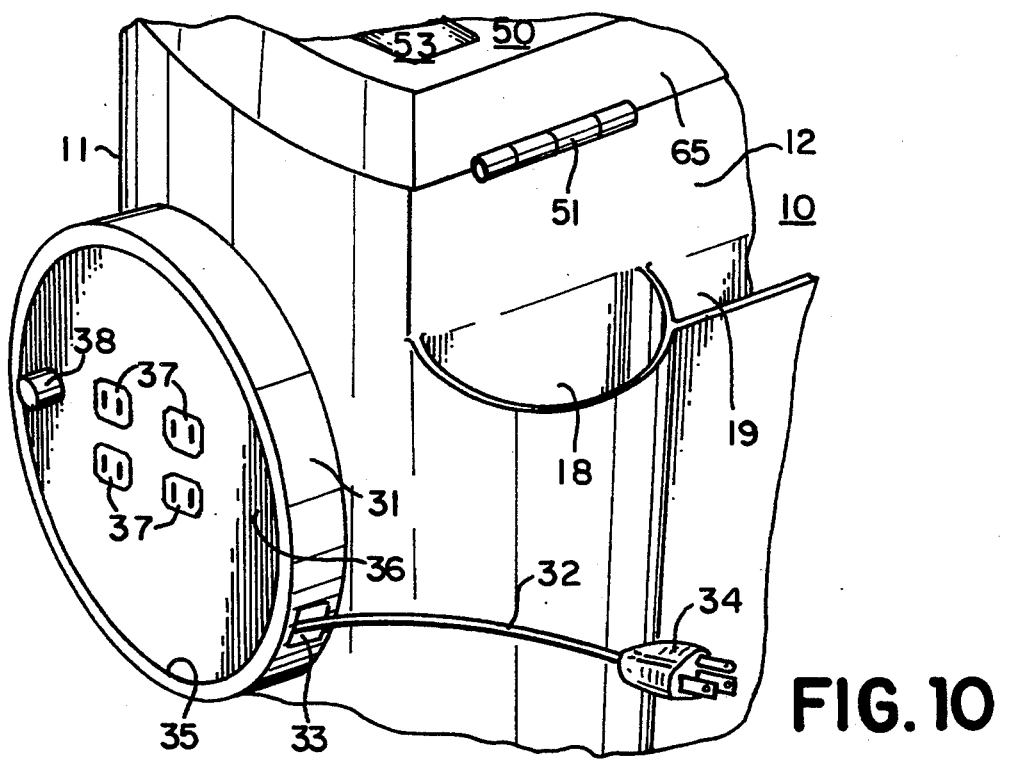
FIG. 10 is a view similar to FIG. 9 but from the right side illustrating the power supply feature of the receptacle.

Referring now to FIGS. 1, 2, 4, and 10 the wall 12 has a circular projection 30 extending from the right side as seen in FIGS. 1 and 10. The cylindrical projection 30 houses an electrical power cord assembly 31 which has a retractable power cord 32 extending though an opening 33 with a plug 34 on the end and which is wound about a spool 35. The spool 35 has a face plate 36 with four power outlets 37 of conventional type and with a rewind handle 38 attached to plate 36 to rotate the spool 35 and retract cord 32.

Referring now more specifically to FIGS. 1, 3, 6, 7, and 8 the receptacle 10 is provided with a lid 50 which is of the same overall configuration as front wall 11 and rear wall 12, and which extends past them to close off access to the interior of housing 13. The lid 50 as well as the housing 13 is preferably formed of molded synthetic plastic of well known type, such as polyvinylchloride. The lid 50 is connected to back wall 12 by a pair of hinges 51 of conventional type to permit or deny access to the interior of housing 13.

The lid 50 has an external surface 52 which is of a well known tread-like pattern to provide a non-slip surface. The lid 50 is also provided with a pair of stud braces or holders 53 which in storage position are situated in recesses 54 in the top of lid 50. The stud braces 53 each have a pair of plates 55 and 56 which are hinged together and can fold up with one plate 56 engaging the outer recess 54 with the other plate 55 in an upright position at a 90° angle to surface 52 to provide a stop against which a piece of lumber (not shown) or other material may be engaged for drilling, sawing or other operations. The lid 50 is also provided with a carrying handle 60 which is of U-shape and hinged by pin 61 to lid 50, which may be stored in a recess 62 in lid 50 when desired. The front wall 12 has a lock piece 63 thereon in selective engagement with a catch plate 65 extending from lid 50.

Figure 8:
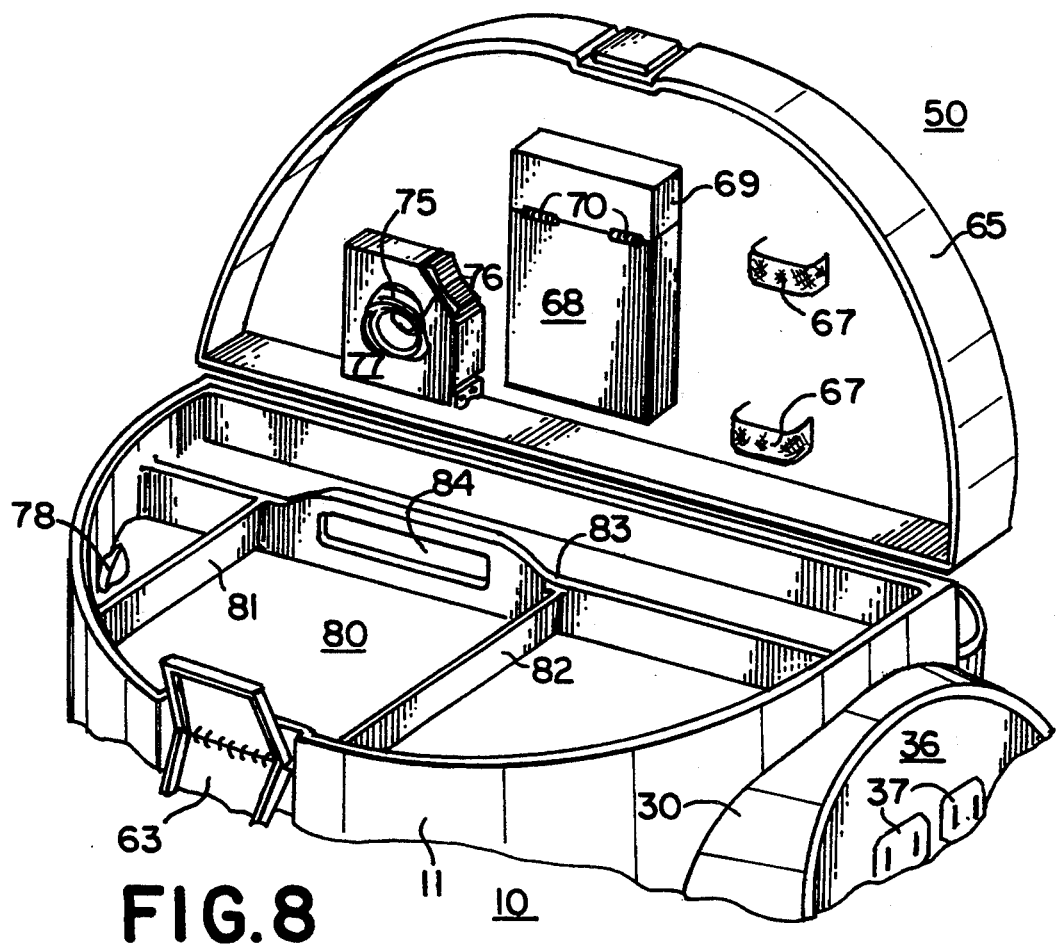
FIG. 8 is a fragmentary, front perspective view, enlarged illustrating the receptacle with its lid in open position for access to the interior of the receptacle.

As shown in detail in FIG. 8, the lid 50 has been raised to permit entry into the housing 13. The lid 50 has a wall 65 extending therefrom around the permitter of the lid which provides a recessed storage location. The lid 50 has on the underside 66 at least two elastic loops 67 which can be used to hold a flashlight (not shown) or other item. A box 68 is provided integral with the lid, of rectangular shape open at the top with a lid 69, which is held thereon by a pair of hinges 70 and with a catch (not shown) to detachably retain the lid 69 to the box 68. The box 68 can be used to store pencils, chalk line, drills and other small items. The lid 50 on its underside 66 is also provided with a clip loop 75 which can be engaged by a clip 76 to detachably retain a measuring tape 77 thereon.

The housing 13 has a perimeter lip 78 thereon which supports a pull out tray 80. The tray 80 is of the same configuration, as housing 13 with upstanding ribs 81, 82 and 83 which divide the tray into several storage areas. The rib 82 has a raised portion 83 and a cut out 84 to form a handle to permit lifting the tray 80 as required. The tray can also be formed of molded plastic such as polyvinylchloride.

It will thus be apparent that apparatus has been provided with which the objects of the invention have been achieved.

I claim:

1. A multi-purpose portable receptacle that combines a tool caddy, work platform, electrical outlet, light and step stool which comprises
    a semi-circular housing open at the top;
    a lid hingedly connected to and closing off the housing opening providing selective access thereinto;
    said lid having carrying handle means;
    lock means to detachably secure said lid to the housing;
    light means connected to the housing; and
    electrical outlet power means to provide a source of electrical power.

2. A receptacle as defined in claim 1 in which
    said lid has means thereon for storing and transporting tools and accessories.

3. A receptacle as defined in claim 1 in which
    said housing is formed of a curved front wall and a flat back wall;
    at least one holster connected to and extending from said rear wall to receive power tools;
    at least one pocket attached to and extending from said rear wall to receive electric cords from said power tools.

4. A receptacle as defined in claim 1 in which said lid is provided with a non-skid surface.

5. A receptacle as defined in claim 1 in which said lid top surface has a pair of stud braces.

6. A receptacle as defined in claim 1 in which
    a retractable cord is provided for connection of said receptacle to a source of electric power.

7. A receptacle as defined in claim 1 in which
    a removable tray is provided inside of said housing.

8. A receptacle as defined in claim 1 in which
    said light means is detachably connected to the side of said housing.

9. A receptacle as defined in claim 1 in which
    said receptacle is formed of molded plastic.

10. A receptacle as defined in claim 2 in which
    said means for storing and transporting includes at least one loop and at least one box on said lid interior of said housing.

* * * * *